(12) United States Patent
Choi et al.

(10) Patent No.: US 8,114,370 B2
(45) Date of Patent: Feb. 14, 2012

(54) METHOD FOR PREPARING CERIUM CARBONATE AND METHOD FOR PREPARING CERIUM OXIDE POWDER

(75) Inventors: Sang-Soon Choi, Samcheok-si (KR); Sang-Yun Jung, Daejeon (KR); Jeong-Kyu Kim, Seoul (KR); Yeong-Dae Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 17 days.

(21) Appl. No.: 12/705,291

(22) Filed: Feb. 12, 2010

(65) Prior Publication Data

US 2010/0226843 A1   Sep. 9, 2010

Related U.S. Application Data

(63) Continuation of application No. PCT/KR2009/004144, filed on Jul. 24, 2009.

(30) Foreign Application Priority Data

Jul. 29, 2008  (KR) .................. 10-2008-0074244

(51) Int. Cl.
 *C01F 17/00* (2006.01)
(52) U.S. Cl. .................. 423/263; 423/419.1; 51/309
(58) Field of Classification Search .................. 423/263, 423/419.1; 51/307, 309
See application file for complete search history.

(56) References Cited

U.S. PATENT DOCUMENTS

| | | | |
|---|---|---|---|
| 2007/0079559 A1* | 4/2007 | Oh et al. .................. | 51/309 |
| 2007/0107318 A1* | 5/2007 | Oh et al. .................. | 51/307 |

FOREIGN PATENT DOCUMENTS

| | | |
|---|---|---|
| JP | 2000159521 A | 6/2000 |
| JP | 2002265932 A | 9/2002 |
| JP | 2008094698 A | 4/2008 |
| KR | 1020070032907 A | 3/2007 |

OTHER PUBLICATIONS

International Search report for PCT/KR2009/004144 dated Feb. 23, 2010, 13 pages.

* cited by examiner

*Primary Examiner* — Steven Bos
*Assistant Examiner* — Richard M Rump
(74) *Attorney, Agent, or Firm* — Rothwell, Figg, Ernst & Manbeck, P.C.

(57) ABSTRACT

The present invention relates to a method for preparing cerium carbonate that can improve yield and productivity of cerium carbonate, cerium carbonate powder, and a method for preparing cerium oxide using the same. The method for preparing cerium carbonate comprises the steps of mixing a cerium precursor and urea; and, elevating the temperature of the mixture to 50~250° C. under solvent free condition to react the cerium precursor and urea.

16 Claims, 9 Drawing Sheets

METHOD FOR PREPARING CERIUM CARBONATE AND METHOD FOR PREPARING CERIUM OXIDE POWDER

CROSS REFERENCE TO RELATED APPLICATION

The present application claims priority to International Application PCT/KR2009/004144, with an International Filing Date of Jul. 24, 2009, which claims the benefit of Korean patent application No. 2008-0074244 filed in the Korea Intellectual Property Office on Jul. 29, 2008, the entire contents of which are incorporated herein by reference.

TECHNICAL FIELD

The present invention relates generally to a method for preparing cerium carbonate and a cerium carbonate powder, and a method for preparing cerium oxide powder.

BACKGROUND

Cerium oxide powder, which is a high functional ceramic material, has been widely used as a catalyst, a phosphor, cosmetics, an abrasive, etc. Recently, cerium oxide powder has received much attention for its use as an abrasive for a CMP (Chemical Mechanical Polishing) process in the field of semiconductor device.

In general, the cerium oxide powder can be prepared by a liquid-phase method, a gas-phase method or a solid-phase method.

According to the liquid-phase method, a pH control agent such as ammonia is added to a starting material, e.g., a trivalent or tetravalent cerium salt to prepare cerium oxide directly from cerium salt. This method is economically advantageous because the cost for raw materials and equipment is comparatively lower than other known methods. Nevertheless, it is difficult to control particle growth in this method because a reaction between starting materials easily occurs from the nucleation stage. Furthermore, fine cerium oxide prepared by the liquid-phase method is not desirable as an abrasive because of its low the polishing rate, which is disadvantageous for a continuous process and it decreases productivity.

According to the gas-phase method, a cerium metal salt precursor is vaporized and then bonded with oxygen, etc. to directly prepare cerium oxide. This method includes flame combustion decomposition, gas condensation decomposition, plasma vaporization, laser vaporization, etc. However, this method has difficulty in terms of mass production of cerium oxide powder because the cost of cerium metal salt precursors and equipment is high. Furthermore, this method is still under study.

Meanwhile, in the solid-phase method, a precursor material is fired at high temperature to prepare cerium oxide. Cerium carbonate is widely used as the precursor, and the physical properties and shape of cerium oxide can be varied depending on the structure and/or shape of cerium carbonate used. Thus, in order to control the physical properties (for example, abrasiveness of cerium oxide, etc,) or shape, etc. of cerium oxide, a method for preparing cerium carbonate, which can easily control the structure or shape of cerium carbonate, is required.

However, a method for preparing cerium carbonate with a certain structure or shape by using a simplified process has not been adequately developed yet, and particularly, there is a continuing demand for a method capable of preparing hexagonal cerium carbonate by a more simplified process.

Moreover, a method for preparing cerium carbonate known so far has a disadvantage of insufficient yield or productivity. In addition, to produce cerium carbonate with a specific shape or crystal structure such as a hexagonal structure, this method requires a high pressure reaction, which raises safety concerns.

SUMMARY

The present invention provides a method for preparing cerium carbonate with improved yield or productivity, a cerium carbonate powder prepared thereby, and a method for preparing a cerium oxide powder using the same.

In one aspect, the present invention provides a method for preparing cerium carbonate, which can improve the yield or productivity of cerium carbonate and easily control the crystal structure or shape thereof, and a cerium carbonate powder prepared thereby.

In one embodiment, the method for preparing cerium carbonate comprises the steps of: mixing a cerium precursor and urea to produce a mixture; and, elevating the temperature of the mixture to 50-250° C. under solvent free conditions to have the cerium precursor and urea react.

In another embodiment, the present invention provides a cerium carbonate powder prepared by the method of the above embodiment.

In another aspect, the present invention provides a method for preparing a cerium oxide powder using the cerium carbonate powder.

In one embodiment, the method for preparing cerium oxide powder comprises the step of firing the above cerium carbonate powder.

DETAILED DESCRIPTION

Figure 1:
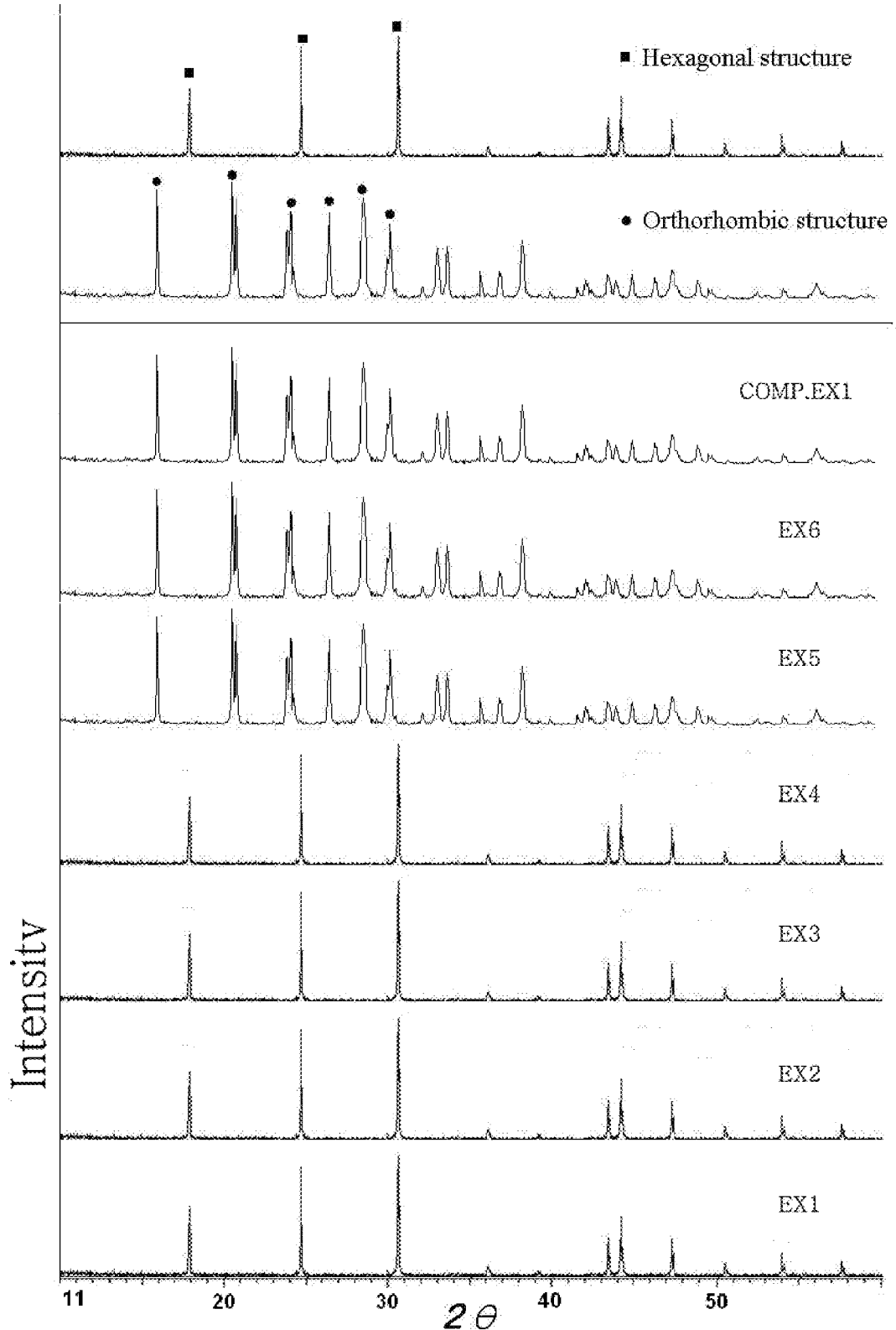
FIG. 1 shows XRD analysis results of cerium carbonate prepared in Examples 1~6 and Comparative Example 1.

The above and other aspects and embodiments are now described in more detail.

In the method for preparing cerium carbonate, the term "solvent free conditions" means that during the process of mixing and reacting the cerium precursor and urea, a solvent, an aqueous solvent or other liquid phase reaction medium is not added to dissolve the reactants. However, even under such "solvent free conditions", a trace amount of water vapor derived from air, etc. can be present in the mixture of the cerium precursor and urea, and when an additive such as nitric acid, etc. is added to the reactants, a small amount of a solvent or an aqueous solvent for dissolving the additive can be used. Thus, the term "solvent free conditions" may include the case where a small amount, e.g., 20 wt % or less, preferably 10 wt % or less, most preferably 5 wt % or less of a solvent, an aqueous solvent or other liquid phase reaction medium is present in the mixture of the reactants and, optionally, an additive such as nitric acid, etc., as well as the case where a solvent, an aqueous solvent or other liquid phase reaction medium is substantially free from the reaction mixture during the process for mixing and reacting the cerium precursor and urea.

In the method for preparing cerium carbonate, after mixing the reactants of a cerium precursor and urea, the temperature of the reaction mixture is elevated to 50-250° C. under the solvent free conditions, and the reaction between the cerium precursor and urea proceeds. For reaction under the solvent free conditions, the cerium precursor and urea may be mixed in a solid state. As the temperature is elevated, part of the cerium precursor or urea may melt and act as a reaction medium for the reaction to occur. In this case, an additional solvent, aqueous solvent or other liquid phase reaction medium may be substantially absent.

The inventors have discovered that the cerium precursor reacts with urea under solvent free conditions while they are melting to produce cerium carbonate with high yield. While not bound by theory, it is believed that the increase of the yield of cerium carbonate can be explained by increasing contacts between the reactants, which is attributed to the comparatively lower volume of the reactants substantially free of an additional reaction medium, than the volume when a separate reaction medium such as a solvent or an aqueous solvent is added to the reactants Further, since the melt of the reactants may act as a reaction medium, the reaction can take place substantially free of a separate additional solvent or aqueous solvent and thereby does not likely involve any problems caused by using a separate reaction medium such as waste water treatment, etc.

And, according to the above method, since the amount of reaction medium used for the reaction is smaller than when adding a separate reaction medium to the reactants, the amount of the reactants, cerium precursor and urea, that can be used in the same volume of a reactor increases, thereby preparing cerium carbonate with high productivity. In addition, according to the above method, the crystal structure or shape of cerium carbonate produced can be readily controllable. While not bound by the following explanation, this benefit can be explained as follows:

Previously, in general, cerium carbonate has been prepared in an aqueous solution state where a cerium precursor and urea are dissolved in an aqueous solvent such as water, by elevating the temperature of the reaction mixture of the aqueous solution to a determined temperature. However, in order to obtain cerium carbonate with a specific crystal structure, for example, hexagonal crystal structure, a reaction should be conducted at a high temperature exceeding 100° C., for example, about 180° C. In order to obtain cerium carbonate with a specific crystal structure, for example, hexagonal crystal structure, by conducting a reaction at such high temperature a reaction needs to be conducted under high pressure, for example, 40 bar or more and up to 100 bar maximum to inhibit evaporation of the reaction medium since the boiling point of the aqueous solvent employed as a reaction medium is 100° C. Especially, since the reaction between the cerium precursor and urea begins when urea is decomposed at an elevated temperature, gas pressure due to the decomposition of urea may further increase the reaction pressure.

Reactions under high pressure may raise safety concerns, and decrease economical efficiency due to the need of expensive high pressure equipment. For this reason, previously, it has been very difficult to selectively prepare cerium carbonate with a specific crystal structure, for example, a hexagonal crystal structure, and economical efficiency has also been very low.

Meanwhile, according to one embodiment of the present invention, since a reaction may be conducted by elevating the temperature of a solid mixture of cerium precursor and urea to melt them, substantially free of a separate reaction medium such as an aqueous solvent, the reaction does not need to be conducted under high pressure. Specifically, since the reactants such as urea have a very high boiling point, it may not be required to increase the pressure substantially while increasing a reaction temperature to a temperature below the carbonization temperature of the reactants. As such, since a reaction can be conducted by elevating the temperature of the reaction mixture to 100° C. or more even under atmospheric pressure, cerium carbonate with a specific crystal structure, for example, hexagonal crystal structure can be easily and selectively prepared.

Therefore, according to a method of the invention, cerium carbonate with a desired crystal structure or shape, etc. can be selectively and effectively obtained by easily controlling reaction conditions of the cerium precursor and urea (for example, reaction temperature, equivalent ratio of reactants or reaction time, etc.) even under low pressure such as 1-2 atm. In addition, since there is no need for using a high pressure reactor during the process, economical efficiency can be improved, and there is no substantial concerns in safety relating to a high pressure reaction.

Meanwhile, the cerium carbonate prepared by the above method can be cerium carbonate with an orthorhombic or hexagonal crystal structure depending on the amounts of the carbonate functional group and absorbed hydroxyl group. By the above-described method, cerium carbonate with these crystal structures can be prepared with high yield and productivity, and cerium carbonate with a desired crystal structure, for example, a hexagonal crystal structure can be easily and selectively prepared. Therefore, cerium carbonate can be selectively prepared by easily controlling the crystal structure or shape thereof, and cerium oxide with desired physical properties (for example, desired polishing property or shape) can be easily obtained therefrom.

In the method for preparing cerium carbonate of the invention, the cerium precursor employed as a reactant may include at least one selected from nitrate, sulfate, chloride or ammonium salt of cerium. Other various compounds comprising cerium with maintaining a solid state at room temperature (for example, −20-40° C.) can be used as the cerium precursor without specific limitations. For example, a cerium salt comprising trivalent or tetravalent cerium can be used as the cerium precursor, and examples thereof include cerium nitrate ($Ce(NO_3)_3 \cdot xH_2O$), cerium sulfate ($Ce(SO_4)_3 \cdot xH_2O$ or $Ce(SO_4)_2 \cdot xH_2O$), cerium chloride ($CeCl_3 \cdot xH_2O$) or diammonium cerium nitrate ($Ce(NH_4)_2(NO_3)_6$ or $Ce(NH_4)_2(NO_3)_5 \cdot xH_2O$) (wherein, x is a constant of from 0 to 10).

Urea($CO(NH_2)_2$), which may act as a carbon source to provide carbonate ion($CO_3^{2-}$), may function as a pH control agent.

Meanwhile, in the method of the invention, the cerium precursor and urea may be mixed in an equivalent ratio of 1:0.5-1:10. If urea is used in an equivalent ratio less than 0.5 to the cerium precursor, the yield of cerium carbonate may decrease, and if it is used in an equivalent ratio exceeding 10 to the cerium precursor, a large amount of residual reactants may decrease the purity of cerium carbonate.

In a method of the invention, cerium carbonate with a desired crystal structure or shape can be easily and selectively prepared by controlling the equivalent ratio of the cerium precursor and urea within the range of 1:0.5-1:10. Specifically, cerium carbonate can have an orthorhombic or hexagonal crystal structure. If the equivalent ratio of the cerium precursor and urea is controlled to be 1:0.5 or more and less than 1:1.5, cerium carbonate with an orthorhombic crystal structure is predominantly formed, and thus the resulting cerium carbonate may comprise cerium carbonate with an orthorhombic crystal structure in an amount of 50 vol % or more. And, by controlling the equivalent ratio of the cerium precursor and urea to 1:1.5 or more and 1:10 or less, and preferably, as will be explained, controlling reaction temperature to 140° C. or more, cerium carbonate with a hexagonal crystal structure may be predominantly formed and the resulting cerium carbonate may comprise 50 vol % or more of hexagonal cerium carbonate.

The reaction between the cerium precursor and urea may be conducted at an elevated temperature of 50-250° C. If an additive such as nitric acid is not separately added, the reaction may be preferably conducted at an elevated temperature of 80-250° C.

It is believed that a carbonate ion produced from decomposition of urea and the cerium precursor react to form cerium carbonate. Since the decomposition of urea actively occurs at approximately 80° C. or more, yield of cerium carbonate can be increased by controlling the reaction temperature to be 80-250° C. If the reaction temperature is excessively elevated, gas pressure due to the decomposition of urea excessively increases, which is not preferable in terms of a reaction pressure and does not significantly increase yield of cerium carbonate.

A selective preparation of cerium carbonate with a desired crystal structure or shape can be also easily achieved by controlling the reaction temperature of the cerium precursor and urea within the temperature range of 80-250° C. Specifically, if the reaction temperature is controlled to be 80° C. or more and less than 140° C., cerium carbonate with orthorhombic crystal structure is predominantly formed and thus cerium carbonate comprising 50 vol % or more of orthorhombic cerium carbonate can be prepared. If the reaction temperature is controlled to be 140° C. or more and 250° C. or less, and preferably the above-described equivalent ratio of the cerium precursor and urea is controlled to be 1:1.5 or more and 1:10 or less, cerium carbonate comprising 50 vol % or more of hexagonal cerium carbonate can be prepared.

A reaction time of the cerium precursor and urea may be controlled to be 0.5-60 hours. Within the reaction time, reaction degree of the cerium precursor and urea can be appropriately controlled to prepare cerium carbonate with high yield. The reaction time can be controlled to correspond to the equivalent ratio of cerium precursor and urea or reaction temperature, etc., considering the crystal structure or shape of cerium carbonate to be obtained.

Cerium carbonate with a desired crystal structure or shape can be selectively prepared by controlling the reaction time of the cerium precursor and urea within the above described time. Specifically, if the reaction time is controlled to be 0.5 hours or more and less than 3 hours, cerium carbonate with orthorhombic crystal structure is predominantly formed and thus cerium carbonate comprising 50 vol % or more of orthorhombic cerium carbonate can be prepared, and if it is controlled to be 3-60 hours, cerium carbonate comprising 50 vol % or more of hexagonal cerium carbonate can be prepared. In order to predominantly prepare hexagonal cerium carbonate, it is most preferable to control the reaction time to be 3-60 hours, the equivalent ratio of the cerium precursor and urea to be 1:1.5 or more, and the reaction temperature to be 140° C. or more.

In the method of preparing cerium carbonate, the cerium precursor may react with urea in the presence of nitric acid. The inventors have confirmed that the addition of the nitric acid may decrease a urea decomposition initiation temperature, which may further lower a reaction temperature, and cerium carbonate can be prepared with a more uniform size, thereby facilitating control of the shape or physical properties of cerium carbonate.

The nitric acid, in order to be added easily and uniformly to a solid state reaction mixture comprising cerium precursor and urea, can be added in an aqueous solution state such that it is dissolved in a small amount of an aqueous solvent. The aqueous solvent constitutes only a small amount of a medium so as to dissolve nitric acid only, and it is not employed in an amount such that it may act as a reaction medium for cerium precursor and urea.

The nitric acid may be added such that the equivalent ratio of urea:nitric acid may be 1:4 or less. If the amount of nitric acid exceeds the above range, the cerium carbonate produced may not maintain crystal structure by being redissolved in nitric acid, lowering yield of cerium carbonate, and making it difficult to prepare cerium carbonate with a desired crystal structure or shape.

In the method of the invention, if nitric acid is used, it is preferable to conduct a reaction between the cerium precursor and urea at an elevated temperature of 50-250° C. Since urea may be decomposed at a temperature lower than its decomposition temperature by the addition of nitric acid, cerium carbonate may be obtained with high yield within the above reaction temperature range. However, if the reaction temperature is excessively elevated, it may not be preferable in terms of a reaction pressure.

And, if nitric acid is used, the reaction temperature may be controlled within the range of 50-250° C. to selectively prepare cerium carbonate with a desired crystal structure or shape. Specifically, if the reaction temperature is controlled to be 50° C. or more and less than 100° C., cerium carbonate with orthorhombic crystal structure is predominantly formed and thus cerium carbonate comprising 50 vol % or more of orthorhombic cerium carbonate can be prepared. If the reaction temperature is controlled to be 100° C. or more and 250° C. or less, cerium carbonate comprising 50 vol % or more of hexagonal cerium carbonate can be prepared. By controlling the equivalent ratio of cerium precursor and urea, for example, to be 1:1.5 or more, and the reaction time, for example, to be 3 hours or more, simultaneously with controlling the reaction temperature, the hexagonal cerium carbonate can be obtained with high selectivity.

It is preferable to further conduct steps for separation; washing; and drying of the cerium carbonate prepared by the above-described method. Any separation methods commonly used in the art, for example, separation by cooling, separation by filtration or centrifugation, may be used for the separation. The washing may be preferably conducted using DI water such that the ion value may be 3 mS or less, thereby, in case cerium oxide is to be obtained by firing cerium carbonate, crystal size of the powder after firing can be appropriately controlled and problems caused by pulverization can be prevented. While the drying may be preferably conducted at approximately 60° C. or more for 24 hours, but the time may be varied depending on the drying temperature.

According to the above described method for preparing cerium carbonate, cerium carbonate can be obtained with high yield and productivity. And, cerium carbonate with a desired crystal structure or shape, for example, orthorhombic or hexagonal cerium carbonate can be easily selectively obtained.

According to another embodiment of the invention, cerium carbonate powder obtained by the above-described method is provided. The cerium carbonate powder may comprise orthorhombic or hexagonal cerium carbonate at an appropriate ratio, and it may comprise one of them in an amount of 50 vol % or more.

Since the crystal structure, etc. of the cerium carbonate powder can be easily controlled during the preparation process to have a desired crystal structure or shape, a cerium oxide powder which satisfies desired physical properties and shape can be easily obtained from the cerium carbonate powder. For example, cerium oxide powder which satisfies physical properties and shape as a CMP abrasive can be easily obtained from the cerium carbonate powder prepared by the above method.

According to another embodiment of the invention, a method for preparing cerium oxide powder comprising the step of firing the cerium carbonate powder is provided.

The firing temperature and method can be selected from a common temperature and method for preparing cerium oxide known in the art. Specifically, the firing temperature may be controlled within the range of from 300° C. to 1500° C., preferably from 400° C. to 1000° C., and the firing may be conducted for 30 minutes to 4 hours. If the firing temperature is too low or the firing time is too short, the crystallinity of the cerium oxide powder may decrease, and thus the cerium oxide powder may not exhibit an appropriate polishing rate for use as a CMP abrasive, etc. And, if the firing temperature is too high or the firing time is too long, the crystallinity of the cerium oxide powder is excessively high, and thus, if used as a CMP abrasive, etc., it may scratch on the polished surface.

The desired physical properties of the cerium oxide powder obtained by the above method may be controlled, for example, so as to exhibit desirable polishing performance when used as a CMP abrasive, by controlling the crystal structure or shape, or volume ratio of the precursor of cerium carbonate powder, that is, volume ratio of the orthorhombic or hexagonal cerium carbonate included in the cerium carbonate. Specifically, the cerium oxide powder prepared from the predominant precursor of hexagonal cerium carbonate powder exhibits a high polishing rate for a silicon oxide film and a low polishing rate for a silicon nitride film, thus showing excellent polishing selectivity between a silicon oxide film and a silicon nitride film, and excellent global planarization. To the contrary, cerium oxide powder prepared from predominant precursor of orthorhombic cerium carbonate powder may exhibit properties favorable for polishing a silicon nitride film having high strength.

DETAILED DESCRIPTION OF THE EMBODIMENTS

The present invention will be explained in detail with reference to the following preferable examples. However, these examples are only to illustrate the invention and the scope of the invention is not limited thereto.

Preparation of Cerium Carbonate

Example 1

Under atmospheric pressure (1 atm) and room temperature (RT), 43.4 g of cerium nitrate, 18 g of urea (3 equivalents) were mixed, and the temperature of the reaction mixture was elevated to 140° C. and then a reaction was conducted for 16 hours while maintaining the temperature. Then, the reaction mixture was slowly cooled and diluted with water to complete the reaction, and then, dried under vacuum of 80° C. for 24 hours to prepare cerium carbonate.

Figure 2:
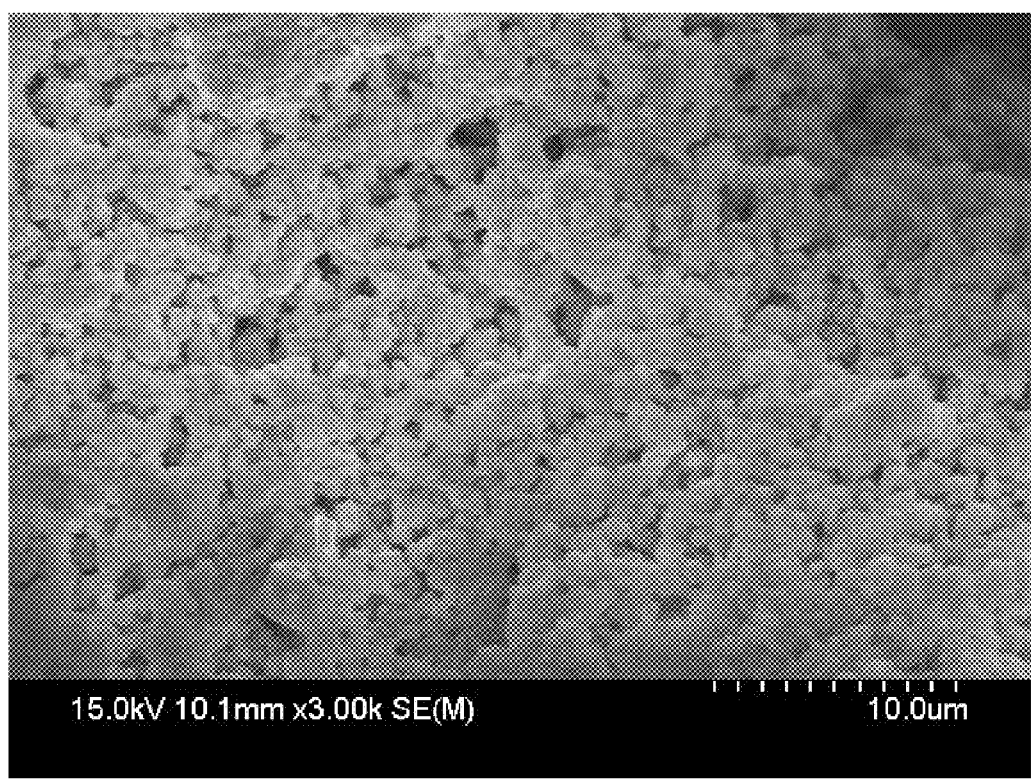
FIG. 2 shows a SEM analysis result of hexagonal cerium carbonate prepared in Example 1.
Figure 3:
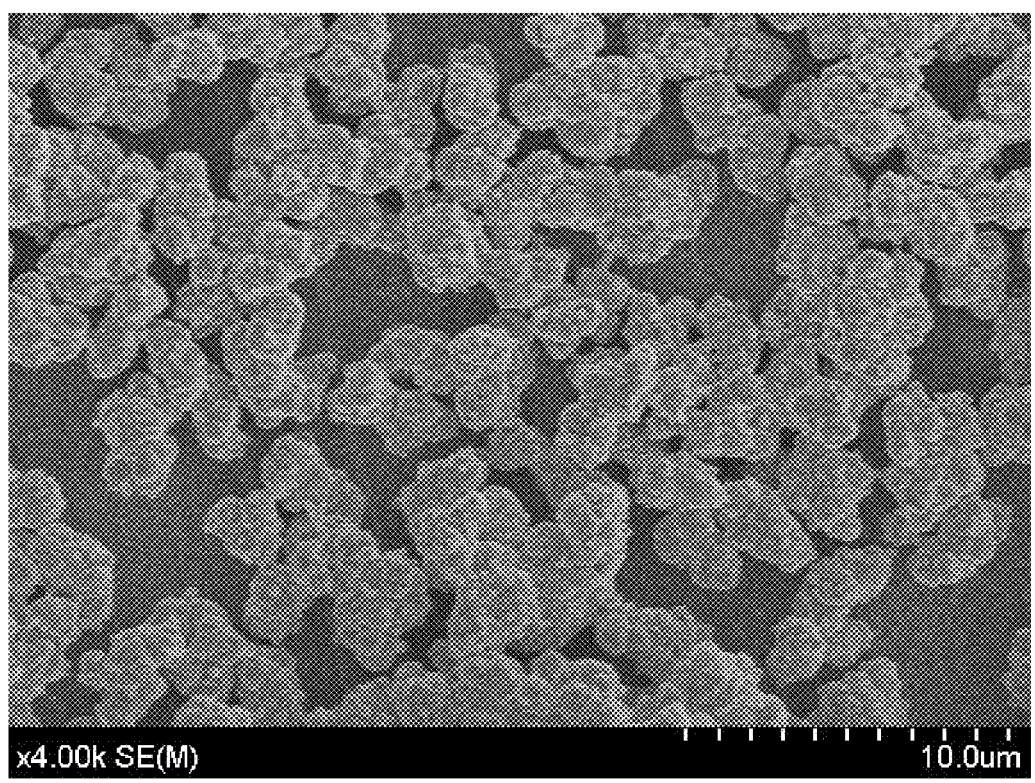
FIG. 3 shows a SEM analysis result of hexagonal cerium carbonate prepared in Example 2.

For the obtained cerium carbonate, XRD analysis and SEM analysis were conducted, and the results were shown in FIGS. 1 and 2, respectively. From these results, it was confirmed that orthorhombic and hexagonal cerium carbonate powders were prepared.

And, the section in which a temperature maintains constantly during the temperature elevation was assumed as a urea decomposition reaction temperature, which was measured and shown in the following Table 1.

And, final yield of cerium carbonate was measured and shown in the following Table 1.

Examples 2~6

Except that the equivalent ratio of cerium nitrate and urea, elevation temperature and the addition of nitric acid were changed, cerium carbonate was prepared by the same method as Example 1. As the nitric acid, a 63% nitric acid aqueous solution was used.

For each of the obtained cerium carbonate, XRD analysis was conducted, and the results were shown in FIG. 1 and related data were shown in the following Table 1. And, for each of the obtained cerium carbonate prepared in Examples 2~5, SEM analysis was conducted and the results were shown in FIGS. 3~6, respectively.

Example 7

Except that reaction temperature was controlled to 100° C. and reaction time was controlled to 3 hours under the reaction conditions as shown in the following Table 1, cerium carbonate was prepared by the same method as Example 1.

Figure 7:
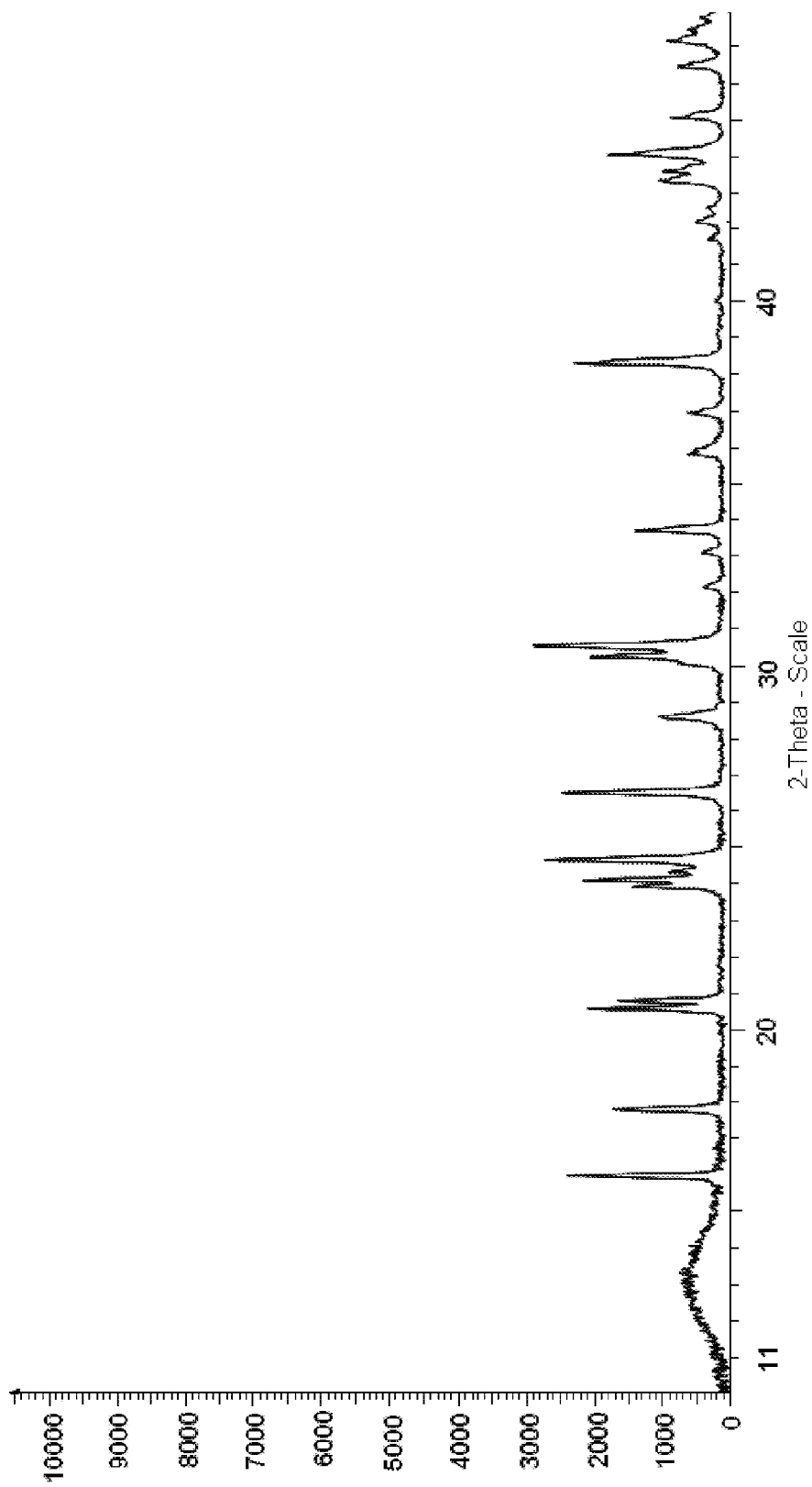
FIG. 7 shows an XRD analysis result of orthorhombic/hexagonal cerium carbonate prepared in Example 7.

For the obtained cerium carbonate, XRD analysis was conducted, and the result was shown in FIG. 7 and the related data were shown in the following Table 1. Through the XRD analysis, etc., it was confirmed that the cerium carbonate of Example 7 is a mixture of orthorhombic cerium carbonate and hexagonal cerium carbonate comprising orthorhombic: hexagonal cerium carbonate in the volume ratio of 2.5:1.

Example 8

Except that reaction temperature was controlled to 140° C. and reaction time was controlled to 3 hours under the reaction conditions as shown in the following Table 1, cerium carbonate was prepared by the same method as Example 1.

Figure 8:
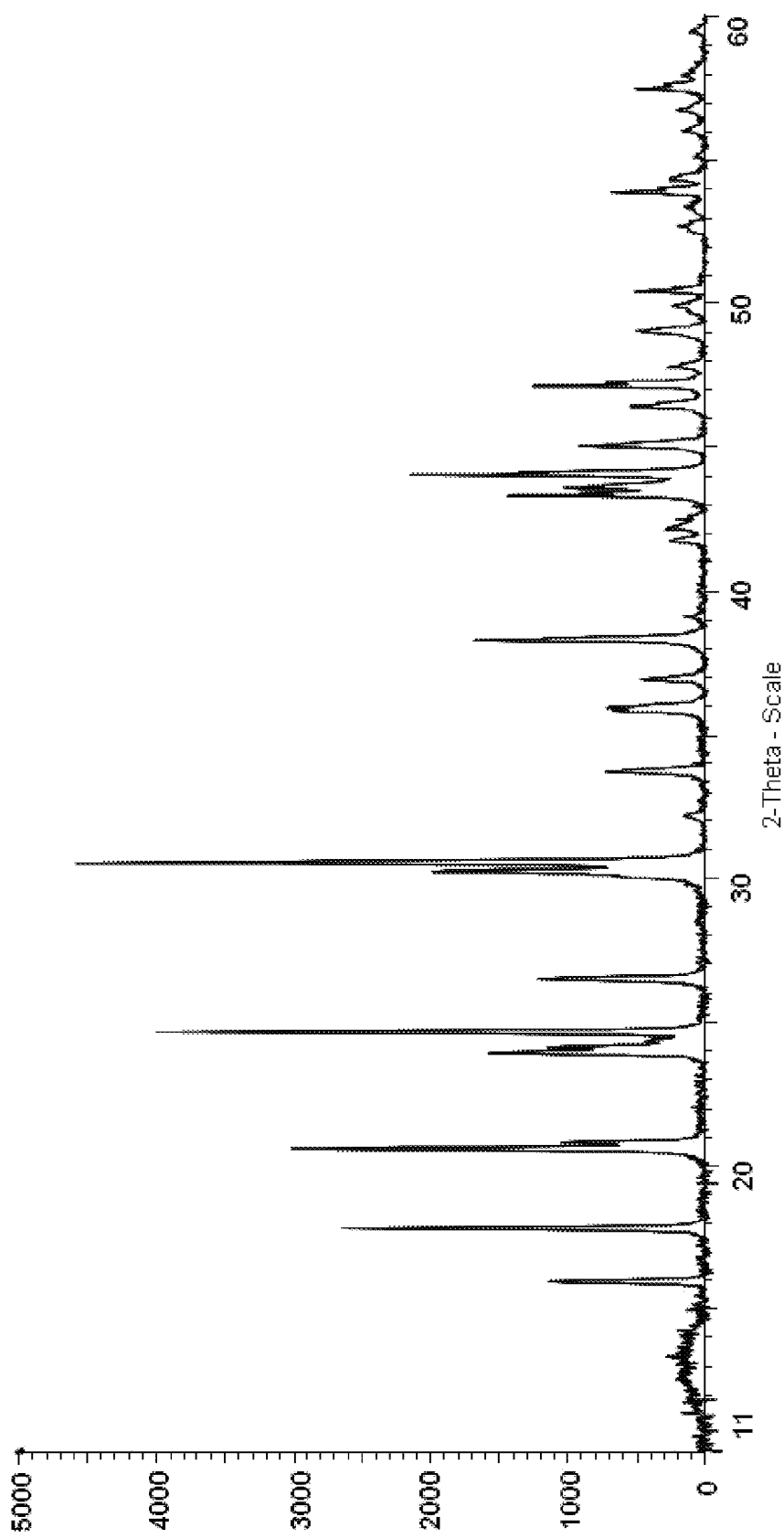
FIG. 8 shows an XRD analysis result of orthorhombic/hexagonal cerium carbonate prepared in Example 8.

For the obtained cerium carbonate, XRD analysis was conducted, and the result was shown in FIG. 8 and the related data were shown in the following Table 1. Through the XRD analysis, etc., it was confirmed that that the cerium carbonate of Example 8 is a mixture of orthorhombic cerium carbonate and hexagonal cerium carbonate comprising orthorhombic:hexagonal cerium carbonate in the volume ratio of 3:5.

Comparative Example 1

Under atmospheric pressure, 3 mol/L of cerium nitrate and 9 mol/L of urea were respectively dissolved in distilled water, and then, the two aqueous solutions were mixed and the mixed solution was reacted at 100° C. for 12 hours.

Figure 9:
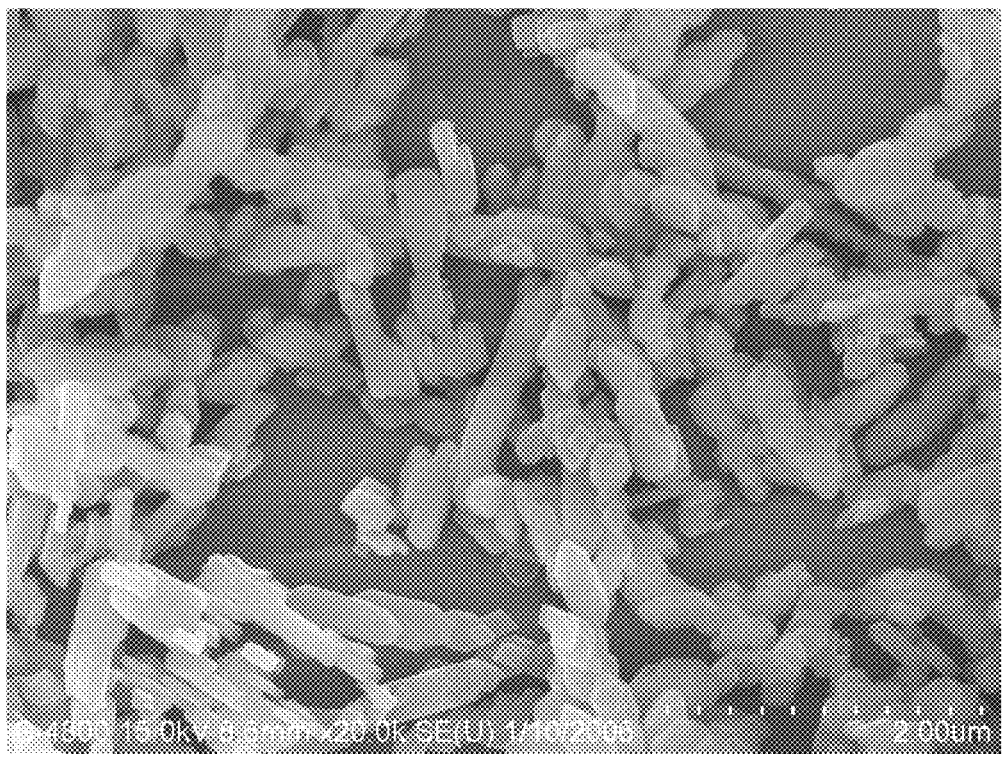
FIG. 9 shows a SEM analysis result of orthorhombic cerium carbonate prepared in Comparative Example 1.

For the obtained cerium carbonate, XRD analysis was conducted to confirm that it is orthorhombic cerium carbonate, and SEM analysis was conducted and the result was shown in FIG. 9 and the related data were shown in the following Table 1.

Comparative Example 2

Under 1 atm, 3 mol/L of cerium nitrate, 9 mol/L of urea were respectively dissolved in distilled water, and then, the two aqueous solutions were mixed and the mixed solution was reacted at 180° C. for 2 hours. Since the product standard of the reactor is about 40 bar, a reaction pressure was controlled so as not to exceed 40 bar, and if it exceeds 40 bar, it was vented so that internal pressure may not exceed 40 bar. It was confirmed that, if not vented, about 90 bar or more of pressure is generated.

Figure 10:
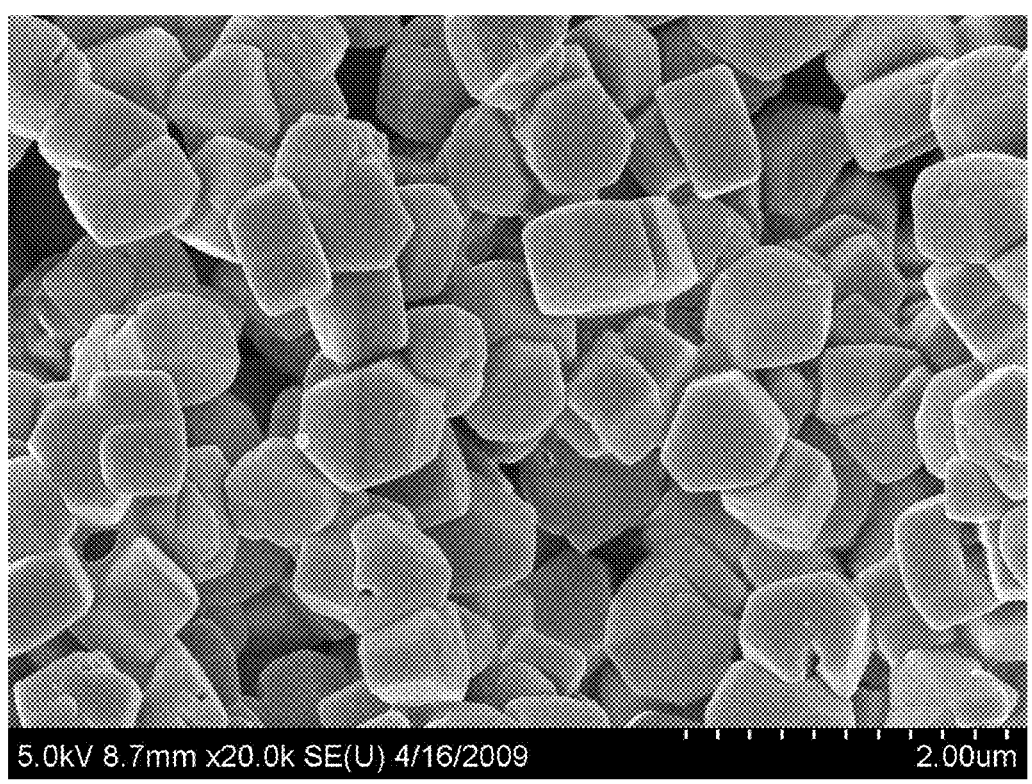
FIG. 10 shows a SEM analysis result of orthorhombic cerium carbonate prepared in Comparative Example 2.

For the obtained cerium carbonate, XRD analysis was conducted to confirm that it was hexagonal cerium carbonate, and the result was shown in FIG. 10 and the related data were shown in the following Table 1.

on the basis of solvent such as water, yield of cerium carbonate is not high, and especially in case preparation of hexagonal cerium carbonate is required, a reaction pressure becomes too high for high temperature reaction thus making it difficult to control the crystal structure of cerium carbonate.

Figure 4:
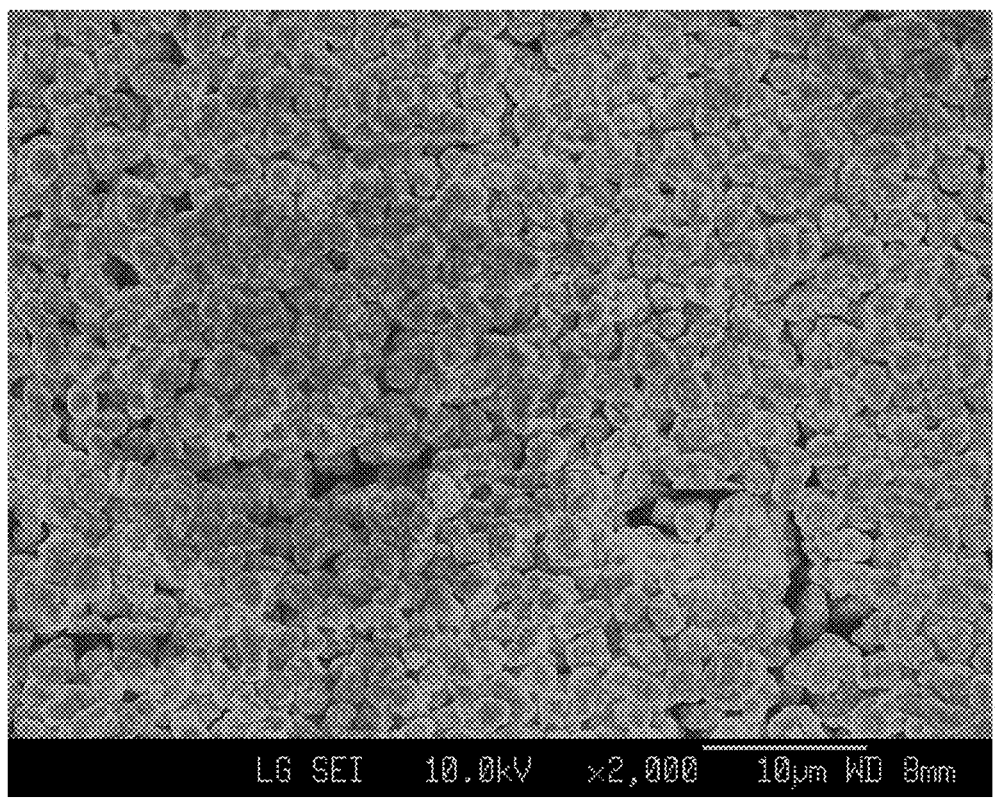
FIG. 4 shows a SEM analysis result of hexagonal cerium carbonate prepared in Example 3.
Figure 5:
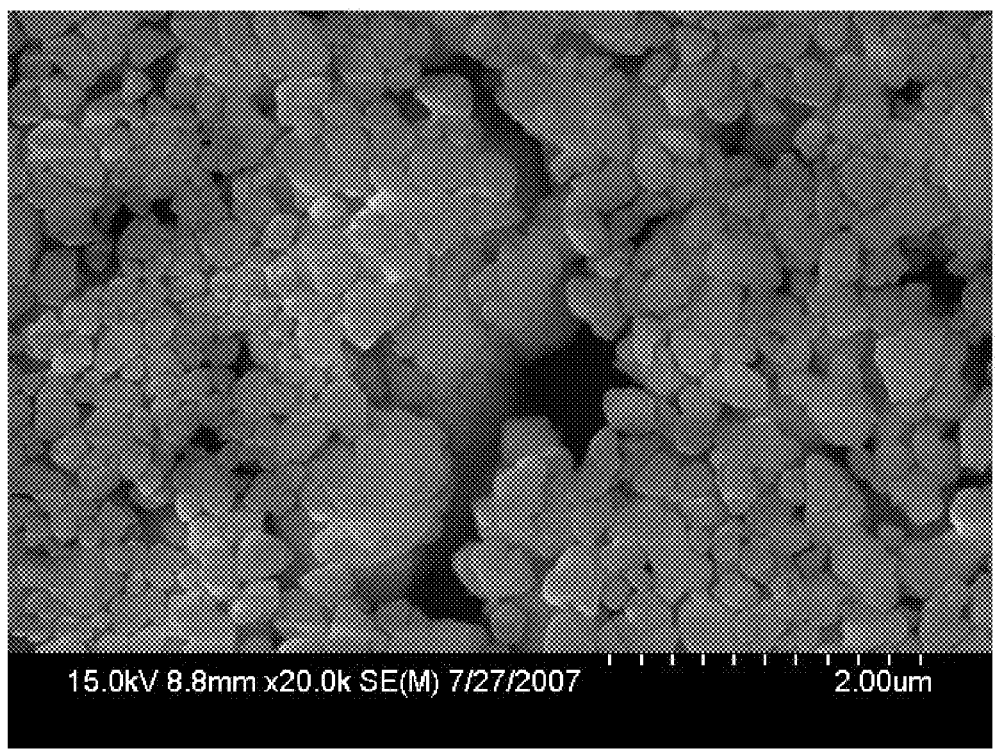
FIG. 5 shows a SEM analysis result of hexagonal cerium carbonate prepared in Example 4.
Figure 6:
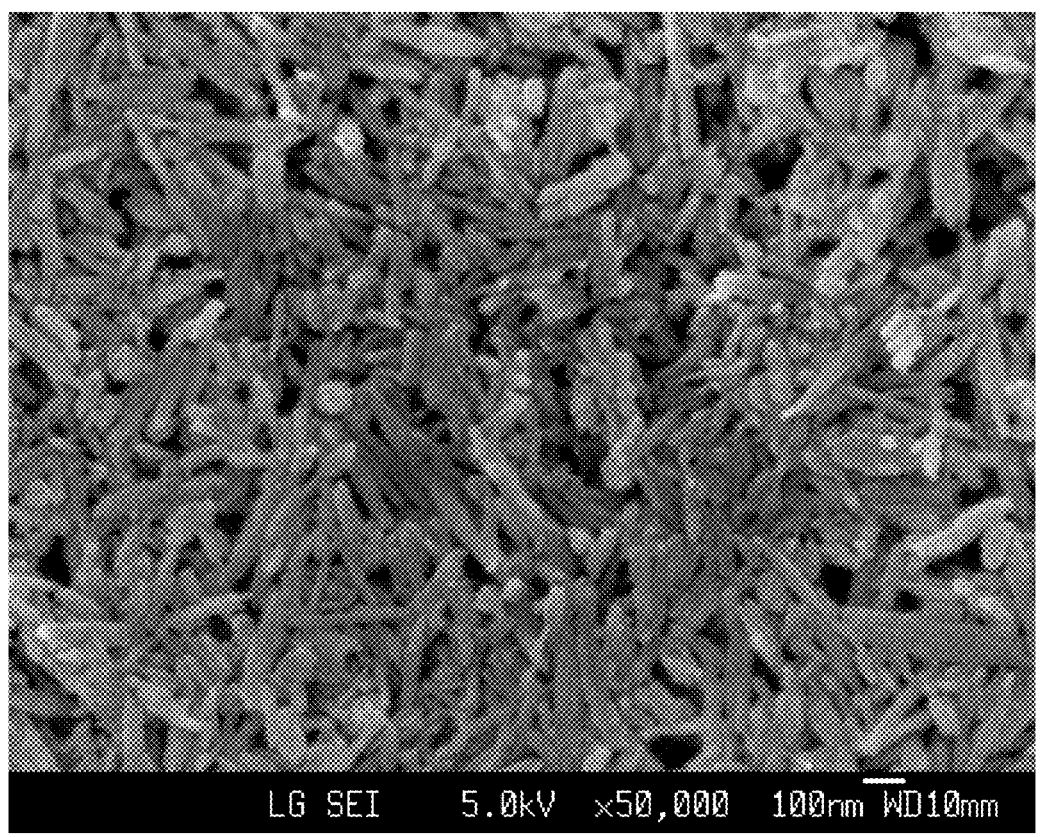
FIG. 6 shows a SEM analysis result of orthorhombic cerium carbonate prepared in Example 5.

And, the experiment results of Examples 3 and 4 showed that in case nitric acid is added to cerium precursor and urea, an urea decomposition temperature becomes lower and cerium carbonate can be prepared with more uniform size (Refer to FIGS. 4 and 5).

Preparation of Cerium Oxide

Example 9

Figure 11:
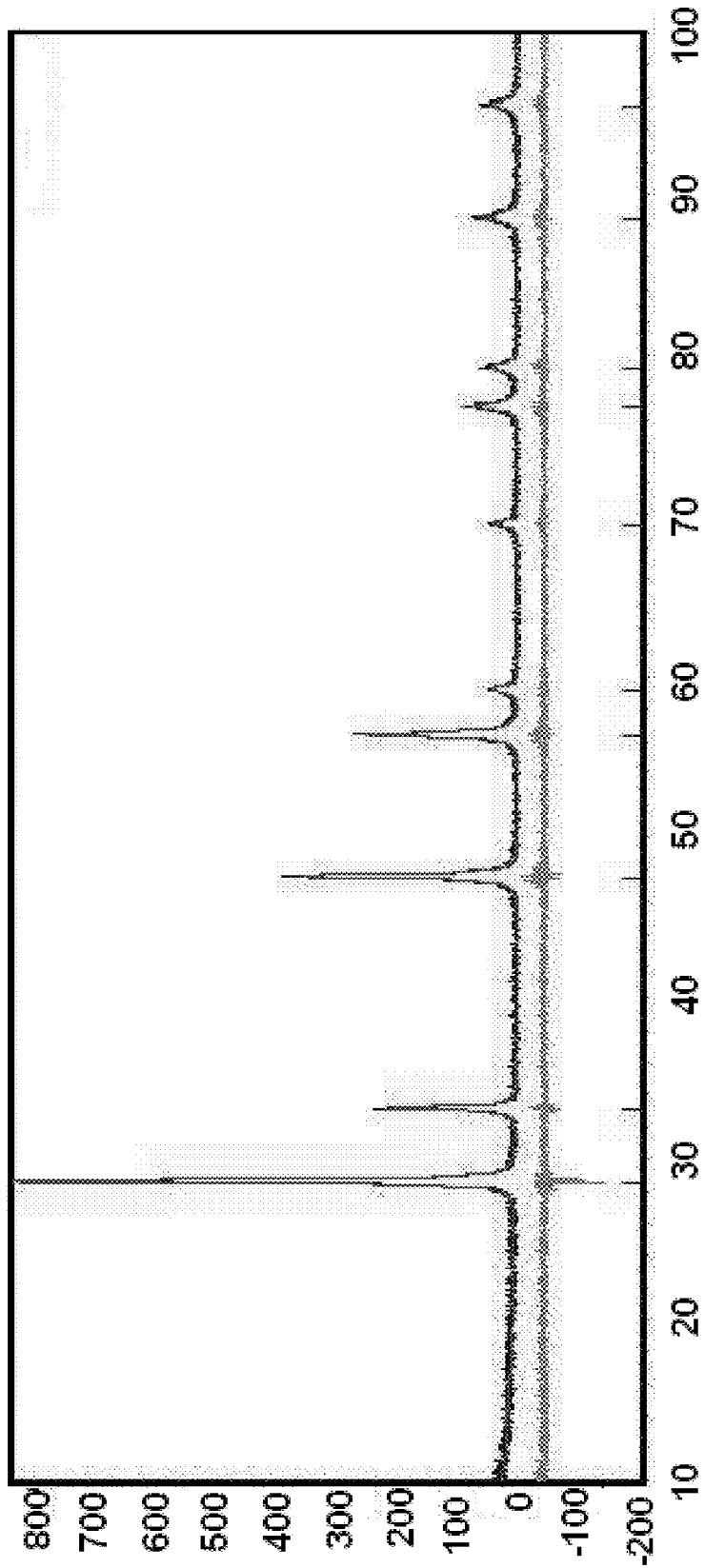
FIG. 11 shows an XRD analysis result of cerium oxide prepared according to Example 9, using cerium carbonate prepared in Example 1.
Figure 12:
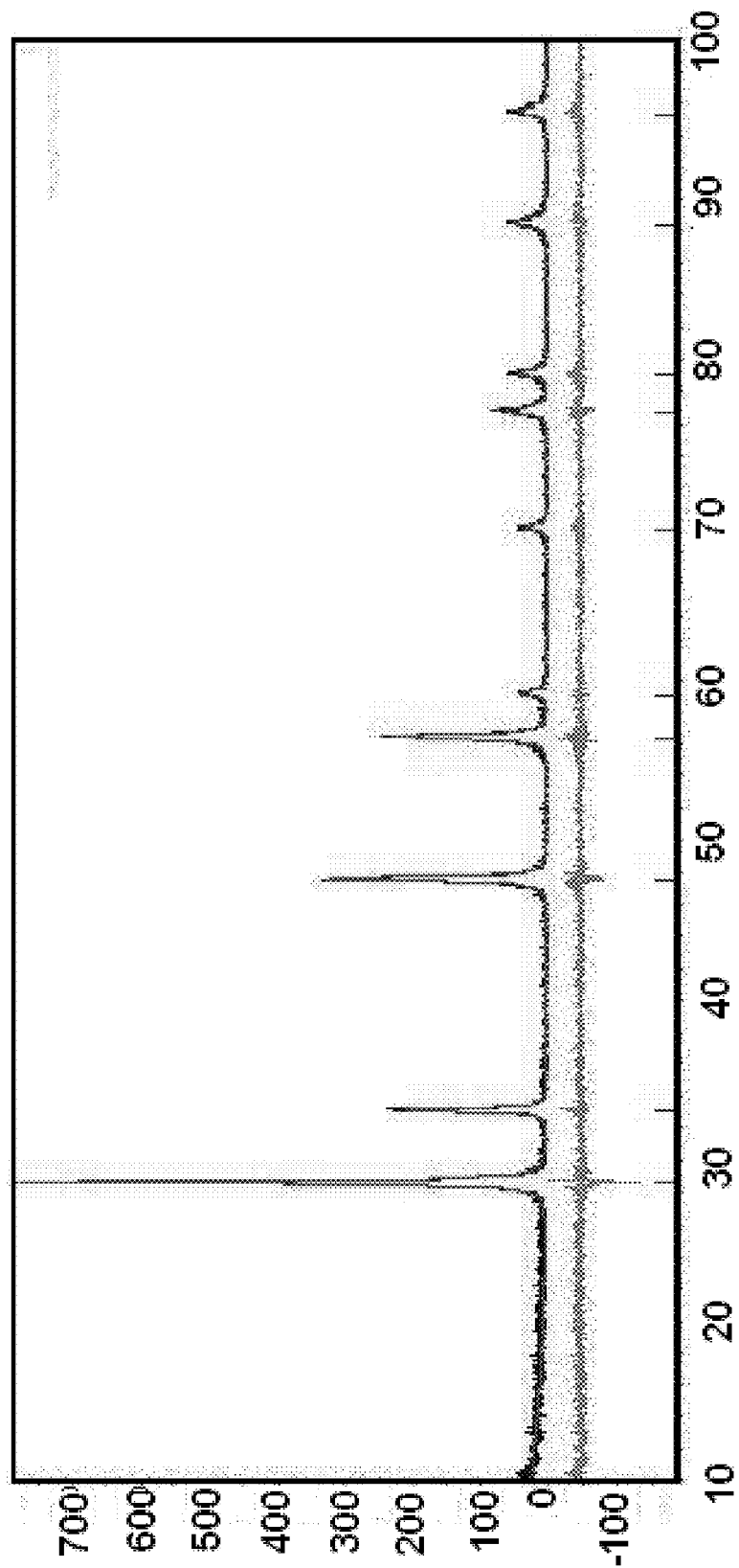
FIG. 12 shows an XRD analysis result of cerium oxide prepared according to Example 9, using cerium carbonate prepared in Example 5.

Cerium carbonate prepared in the above Examples 1 and 5 were heated at 900° C. for 2 hours to prepare cerium carbonate powders, which was analyzed using XRD and the results were shown in FIGS. 11 and 12. From these results, it was confirmed that the cerium carbonate was changed to cerium oxide.

What is claimed is:
1. A method for preparing cerium carbonate comprising the steps of:
 (a) mixing a cerium precursor and urea to produce a mixture; and
 (b) elevating the temperature of the mixture to 50~250° C. to have the cerium precursor and urea react,

TABLE 1

| | Cerium precursor | urea | Final elevation temperature | Nitric acid | Reaction pressure (atm) | Crystal structure of cerium carbonate | Urea decomposition temperature | Yield |
|---|---|---|---|---|---|---|---|---|
| example 1 | 43.4 g | 18 g (3 eq.) | 140° C. | — | 1 | Hexagonal | 90° C. | 95~99% |
| example 2 | 43.4 g | 72 g (10 eq.) | 140° C. | — | 1 | Hexagonal | 90° C. | 95~99% |
| example 3 | 43.4 g | 18 g (3 eq.) | 140° C. | 9.8 g (1 eq.) | 1 | Hexagonal | 80° C. | 95~99% |
| example 4 | 848 g | 360 g (1.5 eq.) | 100° C. | 98 g (0.5 eq.) | 1 | Hexagonal | 50° C. | 95~98% |
| example 5 | 43.4 g | 6 g (1 eq.) | 140° C. | — | 1 | orthorhombic | 90° C. | 95~99% |
| example 6 | 43.4 g | 18 g (3 eq.) | 100° C. | — | 1 | orthorhombic | 90° C. | 95~98% |
| example 7 | 43.4 g | 18 g (3 eq.) | 100° C. | — | 1 | orthorhombic:hexagonal (2.5:1) | 90° C. | 95~98% |
| example 8 | 43.4 g | 18 g (3 eq.) | 140° C. | — | 1 | orthorhombic:hexagonal (3:5) | 90° C. | 95~99% |
| Comparative example 1 | 3 mol/L | 9 mol/L | 100° C. | — | 1 | orthorhombic | 90° C. | 80~85% |
| Comparative example 2 | 3 mol/L | 9 mol/L | 180° C. | — | 40 bar or more | hexagonal | 90° C. | 80~85% |

* eq.: equivalents

As results of the experiments, it was confirmed that cerium carbonate can be prepared by reacting a cerium precursor and urea even under solvent free conditions, and that it can be prepared with higher yield under solvent free conditions compared to preparation on the basis of a solvent such as water. It was also confirmed that the crystal structure, etc. of cerium carbonate can be easily controlled by controlling the equivalent ratio of cerium precursor and urea, elevation temperature, reaction time or the amount of nitric acid, even under relatively low pressure.

To the contrary, referring to Comparative Examples 1 and 2, it was confirmed that, in case cerium carbonate is prepared wherein the step (b) is performed under solvent free conditions such that the mixture contains 0 to 5 wt % of a solvent, an aqueous solvent or other liquid phase reaction medium.

2. The method according to claim 1, wherein the cerium precursor and urea in step (a) are in a solid state.

3. The method according to claim 1, wherein the cerium precursor is at least one selected from the group consisting of cerium nitrate, cerium sulfate, cerium chloride and cerium ammonium salt.

4. The method according to claim 1, wherein the reaction between the cerium precursor and urea is conducted under pressure of 1-2 atm.

5. The method according to claim 1, wherein an equivalent ratio of the cerium precursor and urea in the mixture is 1:0.5~1:10.

6. The method according to claim 1, wherein an equivalent ratio of the cerium precursor and urea in the mixture is 1:0.5 or more and less than 1:1.5 to produce the cerium carbonate comprising cerium carbonate with orthorhombic crystal structure in an amount of 50 vol % or more.

7. The method according to claim 1 wherein the temperature of the mixture is elevated to 80° C. or more and less than 140° C. to produce the cerium carbonate comprising cerium carbonate with orthorhombic crystal structure in an amount of 50 vol % or more.

8. The method according to claim 1, wherein an equivalent ratio of the cerium precursor and urea in the mixture is 1:1.5 to 1:10 to produce the cerium carbonate comprising cerium carbonate with hexagonal crystal structure in an amount of 50 vol % or more.

9. The method according to claim 8 wherein the temperature of the mixture is elevated to 140° C. or more and 250° C. or less to produce the cerium carbonate comprising cerium carbonate with hexagonal crystal structure in an amount of 50 vol % or more.

10. The method according claim 1 wherein the cerium precursor and urea are reacted for 0.5~60 hours.

11. The method according to claim 1, wherein the cerium precursor and urea are reacted for 0.5 hours or more and less than 3 hours to produce the cerium carbonate comprising cerium carbonate with orthorhombic crystal structure in an amount of 50 vol % or more.

12. The method according to claim 1, wherein the cerium precursor and urea are reacted for 3~60 hours to produce the cerium carbonate comprising cerium carbonate with hexagonal crystal structure in an amount of 50 vol % or more.

13. The method according to claim 1, wherein the cerium precursor and urea are reacted in the presence of nitric acid.

14. The method according to claim 13, wherein an equivalent ratio of nitric acid and urea in the mixture is 1:4 or less.

15. The method according to claim 13, wherein the temperature of the mixture is elevated to 50° C. or more and less than 100° C. to produce the cerium carbonate comprising cerium carbonate with orthorhombic crystal structure in an amount of 50 vol % or more.

16. The method according to claim 13, wherein the temperature of the mixture is elevated to 100° C. or more and 250° C. or less to produce cerium carbonate comprising cerium carbonate with hexagonal crystal structure in an amount of 50 vol % or more.

* * * * *